United States Patent [19]

Bertschy et al.

[11] 4,403,227

[45] Sep. 6, 1983

[54] METHOD AND APPARATUS FOR MINIMIZING EVAPORATION IN AN INK RECIRCULATION SYSTEM

[75] Inventors: John R. Bertschy; Walter E. Broom, Jr., both of Boulder, Colo.

[73] Assignee: International Business Machines Corporation, Armonk, N.Y.

[21] Appl. No.: 309,871

[22] Filed: Oct. 8, 1981

[51] Int. Cl.³ .............................................. G01D 15/18

[52] U.S. Cl. ...................................... 346/75; 346/1.1; 346/140 R

[58] Field of Search .......................... 346/1, 75, 140 IJ

[56] References Cited

U.S. PATENT DOCUMENTS

| | | | |
|---|---|---|---|
| 3,761,953 | 9/1973 | Helgeson et al. | 346/75 |
| 3,929,071 | 12/1975 | Cialone et al. | 101/335 |
| 3,930,258 | 12/1975 | Dick et al. | 346/75 |
| 4,084,165 | 4/1978 | Skafvenstedt et al. | 346/140 |
| 4,121,222 | 10/1978 | Diebold | 346/75 |
| 4,130,126 | 12/1978 | Chocholaty et al. | 137/3 |
| 4,178,595 | 12/1979 | Jinnai et al. | 346/140 PD |
| 4,190,846 | 2/1980 | Yamamoto | 346/140 |
| 4,314,264 | 2/1982 | Bok et al. | 346/140 IJ |
| 4,329,696 | 5/1982 | Denlinger et al. | 346/140 IJ X |
| 4,364,059 | 12/1982 | Nagayama | 346/75 |

*Primary Examiner*—George H. Miller, Jr.
*Attorney, Agent, or Firm*—Homer L. Knearl

[57] ABSTRACT

In continuous flow ink jet printers, over 95% of the ink in the ink reservior is recirculated each time the volume of ink in the reservoir is cycled through the printer. The apparatus herein provides a very low evaporation rate for the recirculating ink. With a low evaporation rate, the ink may be replenished with ink alone rather than having to supply ink concentrate and solvent to readjust the ink composition. The low evaporation rate is achieved by keeping the temperature of the ink in the reservoir and at the print head near ambient temperature of the printer's environment and by minimizing the air flow through the reservoir. In addition, the ink in the reservoir is replenished as it is consumed.

10 Claims, 2 Drawing Figures

METHOD AND APPARATUS FOR MINIMIZING EVAPORATION IN AN INK RECIRCULATION SYSTEM

FIELD OF THE INVENTION

This invention relates to ink recirculation in a continuous-flow ink printer. More particularly, the invention relates to minimizing the evaporation rate of the ink so that a single replenishment fluid may be used.

BACKGROUND OF THE INVENTION

Maintaining ink composition in an ink jet printer within an operative range is a significant problem. As the ink solvent evaporates, the concentration of nonvolatile components increases to a level where the printer begins to fail. Typically, this problem is solved by replenishing from separate supplies the ink concentrate and the solvent. This is not attractive because of the expense of shipping two supply items rather than one to a world market. U.S. Pat. Nos. 3,761,953, 3,930,258, 4,121,222 and 4,130,126 show examples of printers having dual replenishment supplies—ink concentrate and solvent.

Another solution to the problem is to use a single replaceable ink reservoir or ink bottle. Because of the evaporation rate in the ink recirculation system, the ink composition becomes more concentrated. The ink bottle must be changed whenever the ink concentration and thus the ink viscosity become too high for print operations. Ink remaining in the bottle, when it is discarded, is lost. U.S. Pat. No. 3,929,071 shows such a printer where ink bottles are replaced even though they are not empty.

The IBM 3890, a bank check processing machine, uses a single replenishment fluid in an ink jet printer. There is a permanent ink reservoir, and replenishment ink is supplied from a separate bottle. The concentration of nonvolatile ink components in the ink composition settles within an operative range because the 3890 has a narrow print rate range. The single type of print usage allows the ink concentration to remain within the operative range for the printer even though the evaporation rate of the ink recirculation apparatus is not controlled.

The problem then is to recirculate ink in a printer having a wide range of print rates while minimizing the ink evaporation rate so that the ink may be replenished with a single fluid.

SUMMARY OF THE INVENTION

This invention has solved the above problem by recirculating back to the ink reservoir only ink near ambient temperature of the printer environment and by minimizing the air flow through the reservoir. In addition, the concentration of nonvolatile components in the ink remains within a narrower range if the ink is replenished substantially continuously.

The temperature of the ink in the reservoir is reduced by recirculating excess ink from the pressurizing means within the pressurizing means ranter than back to the reservoir. The pressurizing means would typically be an ink pump and a pressure regulator. Pressure relief on the high pressure side of the regulator passes ink back to the inlet of the pump. This may cause the temperature of the ink from the pressurizing means to rise. If necessary, a heat exchanger is used to cool the ink before it reaches the print head. By lowering the temperature of the ink at the print head, the evaporation rate at the print head is decreased, and the ink recirculated back to the reservoir is at a lower temperature.

The air flow through the ink reservoir is minimized by increasing the cross-section of the ink return conduit from the gutter and reducing the vacuum applied to the reservoir. The vacuum can be reduced because the larger conduit makes it easier to pull the ink from the gutter back to the reservoir. In addition, if a start/stop gutter is used, a valve closes the return line from this gutter during printing.

The great advantage of our invention is that the printer may be replenished with ink of the proper viscosity, and it is not necessary to separately replace ink concentrate and ink solvent.

DETAILED DESCRIPTION

Figure 1:
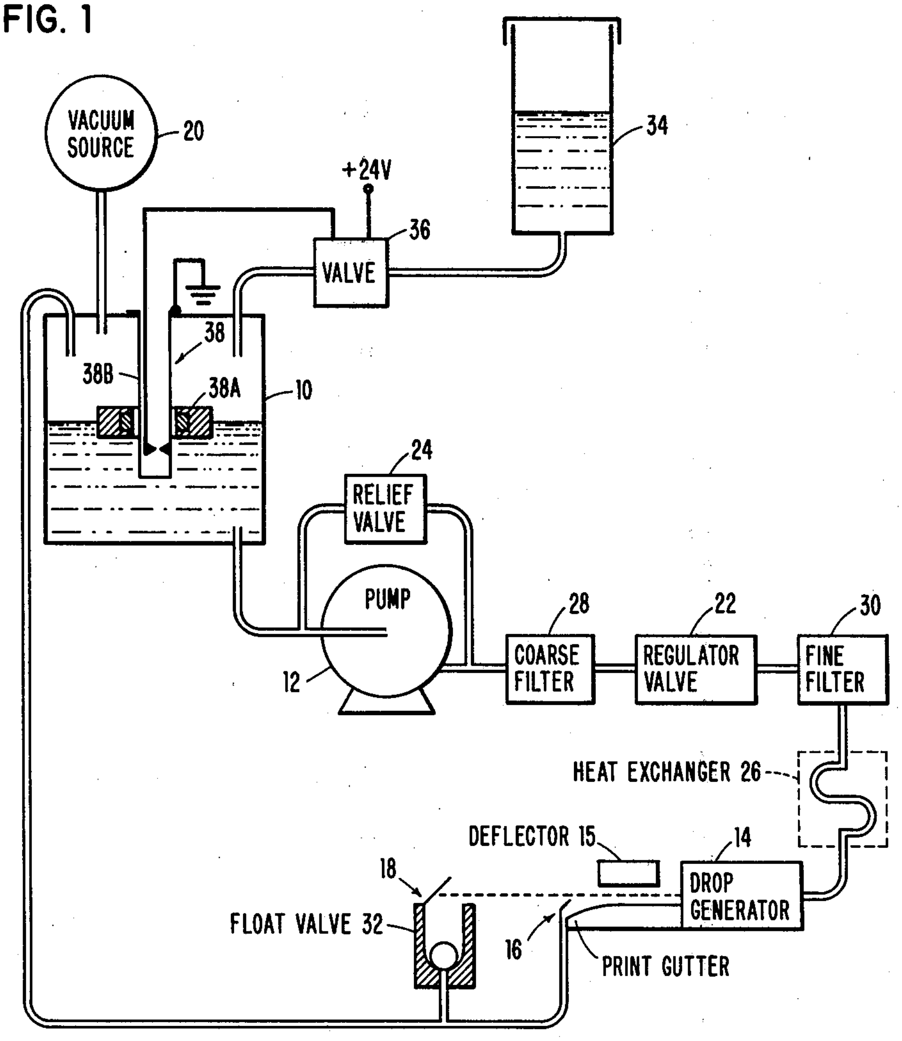
FIG. 1 shows the preferred embodiment of the present invention.

Referring now to FIG. 1, the ink is pumped from reservoir 10 by pump 12 to the drop generator 14 in the print head. Ink is recirculated back to the reservoir 10 either from the print gutter 16 or from a start/stop gutter 18. Ink is drawn back into the reservoir from these gutters by maintaining a slight vacuum in reservoir 10. The vacuum is supplied by vacuum source 20.

The print head consisting of drop generator 14, charge and deflection electrodes 15 and print gutter 16 is of the continuous-flow type. It may be single nozzle or multiple nozzle. An example of a multiple nozzle head with a print gutter and a start/stop gutter is described in U.S. Pat. No. 4,266,231 issued to G. A. Drago et al. on May 5, 1981.

The ink supplied to the drop generator 14 is under pressure. The pressure at the drop generator is controlled by regulator valve 22. Pressure regulator valve 22 is adjustable to control the ink pressure at the print head and thus the ink drop velocity.

Pump 12 pressurizes the ink upstream from regulator valve 22 at a higher pressure than that at the drop generator 14. Excess pressure upstream from regulator valve 22 is relieved by relief valve 24. Pressure relief valve 24 is also adjustable. Ink released through the pressure relief valve is passed directly back into the inlet of ink pump 12.

Because of the work done on the ink by pump 12, the ink is heated by the pump. To minimize the effect of the heated ink on the evaporation rate in the recirculation system, the warm ink from the relief valve 24 is passed directly back to the pump 12 rather than into reservoir 10. This, of course, will elevate the temperature of the ink downstream from the pump by a few degrees.

To reduce the ink temperature before it reaches the drop generator 14, the ink passes through a heat exchanger 26. Heat exchanger 26 is simply a circuitous path of metal tubing across which air is blown. An S shaped curve section of tubing with a small fan blowing across it has been sufficient to cool the ink to a temperature near the ambient temperature of the printer's environment.

Two filters are provided between pump 12 and drop generator 14. The first filter 28 is a coarse filter. Its purpose is to block any relatively large particles that might have somehow entered the ink system. The second filter 30 is a fine filter. The purpose of the fine filter is to pick out all particles that might cause blockage of a nozzle.

In summary, in the portion of the ink system between the ink reservoir 10 and the drop generator 14, the ink is pressurized while minimizing the temperature of the ink at the reservoir 10 and the drop generator 14. This is accomplished by feeding any excess ink between the outlet of the pump and the pressure regulator back to the inlet of the pump 12 rather than into the reservoir 10 and further accomplished by providing a heat exchanger to cool the ink before the ink reaches the drop generator 14.

The ink recirculation apparatus of the invention also reduces the evaporation rate of ink in the printer by minimizing the air flow through the ink reservoir 10. Ink reservoir 10 is a closed tank. The only air flow through the reservoir 10 is that produced by vacuum source 20 as it draws ink and air from the print gutter 16 and start/stop gutter 18 into the reservoir 10. To minimize air flow, the fluid conduit between the gutter and the reservoir should have a low resistance to ink flow so that a low vacuum can be used to draw the ink to the reservoir. With tubing at least 2 mm in diameter, a vacuum as low as 10 cm of water may be used. In a normal printing operation, the print gutter 16 will be filled with ink. Thus normally, there is little or no air flow from the print gutter 16 to the ink reservoir 10.

The start/stop gutter 18 has ink in it only during the start/stop operation. Once the print head is up and running, there would be no ink in the gutter 18, and air would normally be drawn through the start/stop gutter into the ink reservoir 10. However, a float valve 32 is provided just below the start/stop gutter 18 so that when there is not enough ink present to open the float valve, there is no air drawn in through gutter 18 to the ink reservoir 10. Thus, when the print head is up and running, there is little or no air flow through the ink reservoir 10.

During start/stop of the print head, when the ink streams are directed to the start/stop gutter 18, air can be drawn into print gutter 16. The start/stop sequence lasts only a few seconds and is a small portion of the operating time of the printer. Therefore, no valve has been provided to close off the print gutter 16 when not in use. However, if desired, a second float valve like float valve 32 could be provided between print gutter 16 and the ink reservoir 10.

In addition to maintaining a low evaporation rate, the ink system of the present invention also replenishes ink in reservoir 10 each time the volume of ink in the reservoir 10 changes approximately a tenth of a percent by weight. The ink to replenish the reservoir comes from an ink bottle 34. Ink bottle 34 is replaceable or has a removable cap by which it can be refilled. The composition of the ink in bottle 34 is near the composition of the ink in reservoir 10.

To replenish ink in reservoir 10, solenoid valve 36 opens and ink is drawn from bottle 34, which is open to the atmosphere, to the reservoir 10 by the vacuum in reservoir 10. Solenoid valve 36 is controlled by float switch 38 mounted in reservoir 10. Float switch 38 is a liquid level switch, Model LS-19735, available from Delaval Turbine Inc., Gem Sensors Division; however, any number of liquid level sensors could be used.

In operation, float switch 38 is normally open except when magnets are positioned to close the switch. The contacts are permanently mounted in the stem 38B of the switch in a fixed position in the reservoir 10. The float 38A contains magnets and rises or falls on the stem 38B as the fluid level in reservoir 10 changes. When the magnets are positioned near enough to the contacts of the switch to close the contacts, solenoid valve 36 opens, and ink from bottle 34 flows into reservoir 10. When the float 38A rises, the contact in switch 38 open and solenoid valve 36 closes. In effect, the level of the ink in reservoir 10 is held substantially constant by float switch 38 opening and closing valve 36.

Figure 2:
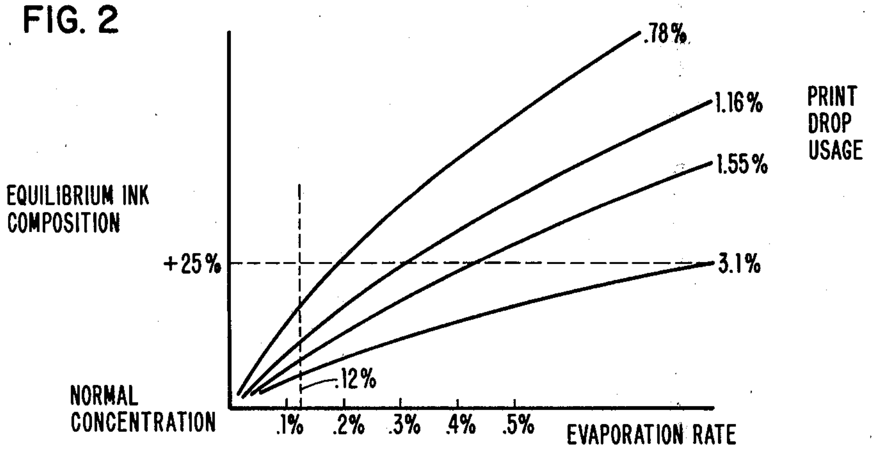
FIG. 2 is a graph showing the equilibrium ink composition in an ink jet printer at four separate print rates as a function of evaporation rate.

Referring now to FIG. 2, the advantages of a low evaporative rate ink recirculation system become apparent. Plotted on the vertical axis in FIG. 2 is the percentage change in ink concentration. The horizontal axis is the evaporation rate, the percentage of ink evaporated in one complete cycle through the printer of all the ink in the ink reservoir 10. Plotted on the graph is the equilibrium ink composition vs. evaporation rate for various print drop usage rates. For example in the topmost curve, the printer prints 0.78% of the drops emitted by the nozzles. In other words, 99.22% of the ink is recirculated. The bottommost curve represents a print drop usage rate of 3.1% where 96.9% of the ink is recirculated. The latter printing job would contain large black areas. The typical text or printed page would be on the 1.55% print drop usage curve.

The graph in FIG. 2 makes it very clear that as the print drop usage rate goes up, evaporation of the ink is less of a problem. This is because the ink is being used at a sufficiently rapid rate that evaporation has a small effect on the quantity of ink even though the evaporation rate may be high. As the print drop usage rate goes down, the evaporation rate becomes more critical.

The 25% more concentrated line indicated on the vertical axis is approximately the point where the ink becomes unusable. Beyond this point, the ink nonvolatiles may precipitate and create problems in the ink system. Thus, the graph in FIG. 2 makes it apparent that to operate at various print drop usage rates and to maintain ink concentration at acceptable levels, it is necessary to have low-evaporation ink recirculation apparatus. The apparatus of the present invention has operated at an evaporation rate of 0.12% in an ambient environment of 73 degrees F. (21 degrees C.), approximately 40% relative humidity with vacuum of 4" (10 cm) of water pulled on the ink reservoir and 76 degrees F. (23 degrees C.) at the print head or drop generator. In addition, the apparatus has also been operated at the extreme environment of 91 degrees F. (33 degrees C.) and 5L% relative humidity, and the resulting evaporation rate was only 0.23%. A 0.12% evaporation rate (or even a 0.23% evaporation rate), as shown in FIG. 2, means that the apparatus can handle a wide variety of print drop usage rates.

While we have illustrated and described the preferred embodiment of our invention, it is understood that we do not limit ourselves to the precise constructions herein disclosed and the right is reserved to all changes and modifications coming within the scope of the invention as defined in the appended claims.

What is claimed is:

1. In an ink recirculation system for a continuous flow ink jet printer, said system having an ink reservoir, a pump for pumping ink from the reservoir to a print head, a pressure regulator between the pump and the print head, an ink replenishment supply, a return ink conduit between the gutter at the print head and the reservoir, and a vacuum source to reduce the air pressure in the reservoir below atmospheric pressure, improved apparatus for reducing the evaporation rate of ink solvents from the system, said apparatus comprising:

means for minimizing the passage of heat from the pump to ink at the print head and in the ink reservoir;

said return conduit between the gutter and the reservoir having a low resistance to ink flow and said vacuum source reducing the air pressure in the reservoir only slightly below atmospheric pressure in order to reduce air flow through the reservoir whereby the evaporation rate of solvents in the ink is maintained at a low level.

2. The apparatus of claim 1 and in addition:

a second ink return conduit from a start-stop gutter in the print head;

means for shutting off air flow through said second return conduit when it is not being used.

3. The apparatus of claim 1 wherein said minimizing means comprises:

means for recirculating excess ink from the pressure regulator back to the inlet of the pump so that ink warmed by the pump is not returned directly to the reservoir;

means for reducing the ink temperature, after the ink leaves the pressure regulator and before the ink jets from the print head, to a temperature substantially near the temperature of the environment of the printer so that the evaporation rate of ink solvents at the print head and in the reservoir is reduced.

4. The apparatus of claim 1 and in addition:

said ink replenishment supply is a single fluid supply;

means for replenishing the ink in the ink reservoir with ink from said supply at a substantially constant rate as the ink is consumed.

5. The apparatus of claim 4 wherein said replenishing means comprises:

means for sensing the changes in level of the ink in said reservoir;

means for drawing ink from said ink replenishment supply to said reservoir only when the ink level in the reservoir goes below a predetermined level whereby the level of ink in said reservoir is held substantially constant near the predetermined level.

6. A method for maintaining the ink composition in an ink recirculation system within an operative range for the printer using the ink, said method comprising the steps of:

recirculating back to an ink reservoir in the system only the ink having a temperature substantially near ambient temperature of the environment of the printer;

replenishing the ink in the reservoir at substantially the same rate that the ink is consumed by the printer;

reducing the air flow through the ink reservoir whereby the temperature and air flow are low enough to reduce the evaporation rate of the ink below a point where the ink concentration stays within the operative range of the printer for each of the multiple, ink-usage rates of the printer.

7. The method of claim 6 and in addition:

controlling the temperature of the ink at the print head in the printer to reduce the evaporation rate of the ink at the print head.

8. Method for minimizing evaporation in ink recirculation apparatus having an ink reservoir, an ink jet print head including a gutter to catch ink drops not used, means for pressurizing the ink after it leaves the reservoir and before it reaches the print head, and means for passing ink from the gutter back to the reservoir, said method comprising the steps of:

recirculating excess ink within said pressurizing means so that ink warmed by the pressurizing means is not returned directly to the reservoir;

cooling ink after it leaves the pressurizing means and before it reaches the print head so that ink at the print head is cool and has a low evaporation rate;

inhibiting air flow from the gutter through said passing means and through the reservoir so that ink in the reservoir has a low evaporation rate.

9. The method of claim 8 wherein the passing means includes a low flow-resistance, fluid connection between the gutter and the reservoir and means for applying a vacuum to the ink reservoir; and wherein said inhibiting step comprises the steps of:

setting the vacuum in said reservoir to a level just sufficient to draw ink from the gutter through the fluid connection to the reservoir;

closing the fluid connection between the gutter and the reservoir when there is not enough ink in the gutter to prevent air flow through the reservoir.

10. The method of claim 8 wherein said pressurizing means includes a pump and a pressure regulating valve to control the ink pressure at the print head, and wherein said recirculating step comprises the steps of:

releasing ink from the pressurizing means to relieve excess ink pressure between the pump and the pressure regulating valve;

passing ink released by said releasing step back to the inlet of the pump.

* * * * *